United States Patent [11] 3,622,445

[72] Inventor August Pieter Louis Heidweiller
   Apeldoorn, Netherlands
[21] Appl. No. 729,578
[22] Filed May 16, 1968
[45] Patented Nov. 23, 1971
[73] Assignee Koninklijke Papierfabriken Van Gelder
   Zonen N.V.
   Amsterdam, Netherlands
[32] Priority May 18, 1967
[33] Netherlands
[31] 67/06889

[54] GLASS-FIBER WEBS EMPLOYING GLASS FIBERS WITH DIAMETERS OF 3–15 MICRONS
10 Claims, 1 Drawing Fig.
[52] U.S. Cl. .................................................. 162/145,
   161/169, 162/146, 162/156
[51] Int. Cl. .................................................. D21f 5/18
[50] Field of Search ........................................ 162/156,
   145, 146; 161/170, 169

[56] References Cited
UNITED STATES PATENTS
3,035,965  5/1962  Mathews ..................... 162/145
2,962,414  11/1960  Arledter ..................... 162/145
3,441,472  4/1969  Foster ......................... 162/145

Primary Examiner—S. Leon Bashore
Assistant Examiner—Richard H. Tushin
Attorney—Diller, Brow, Ramik & Holt ABSTRACT: Glass-fiber webs having a low weight per square meter and superior strength characteristics are made by preparing a homogeneous suspension of fibers of a glass selected from the group of C and E glasses, having a diameter of 3–15 microns, and fibers of a material selected from the group consisting of the polyesters, polyamides and polyvinyl chloride, in water, the weight ratio between the glass fibers on the one hand and the organic fibers on the other ranging from 10:1 to 1:1, bringing said suspension onto a moving screen cloth, removing the excess of water with about 5–50 percent of a binder being added somewhere during the process, and drying the fiber mat provided with a binder by heating.

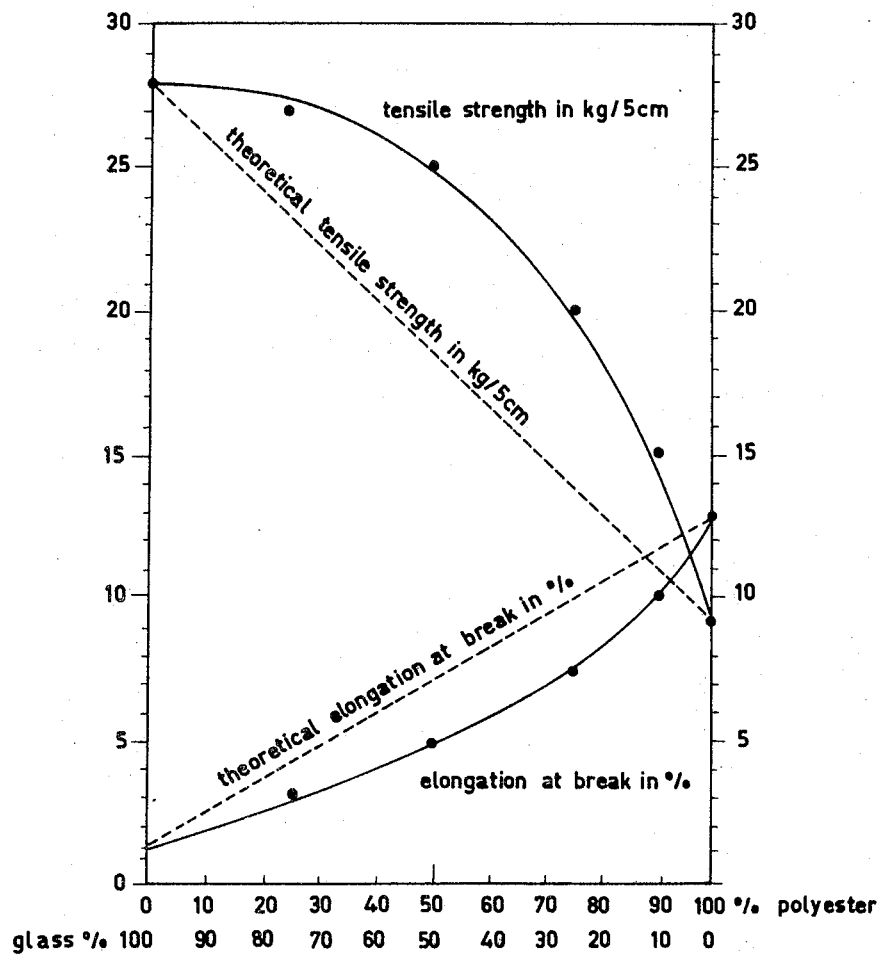

GLASS-FIBER WEBS EMPLOYING GLASS FIBERS WITH DIAMETERS OF 3-15 MICRONS

This invention relates to a method of making glass-fiber webs. Glass-fiber webs or glass-fiber mats are presently being used on a considerable scale for reinforcing synthetic resin materials in order to improve the strength characteristics of the products made from these synthetic materials.

For the manufacture of glass-fiber materials it is customary first to chop up a spun glass to strands having a length of 0.3–10 cm., such strands typically consisting of 200–400 elementary glass filaments. These chopped strands are blown onto a rotary screen cloth by means of a stream of air, sprayed with a binder, and heated to produce a more or less coherent glass-fiber mat. This prior method has the disadvantage, however, that, owing to the thick glass-fiber strands, it is impossible to produce homogeneous mats having a basic weight of less than 300 g./m.$^2$. Glass-fiber mats having a basic weight of 300–500 g./m.$^2$ are also still highly nonuniform in strength characteristics, and they moreover have a very rough surface with various protruding glass-fiber strands.

Accordingly, for reinforcement purposes, there is usually additionally used a surface web in order to achieve a smooth surface.

According to another method, molten glass is drawn to form filaments, which are laid upon a rotary conveyor cloth by means of a stream of air. After the addition of a binder, followed by drying, the product is a more or less homogeneous glass web, which can be made in a thinner form than is possible with the use of a glass-fiber strands. For technical reasons, this purpose does not allow the use of high-melting (2,200° C.) alkali-free glass (E-glass), but us limited to the lower melting A-glass (600° C.) or C-glass (about 900° C.). Since A-glass has an alkali content of about 13 percent and E-glass an alkali content of about 0.6 percent, it will be understood that A-glass is considerably less resistant to weather influences than E-glass, so that the limitation referred to is heavily felt. Moreover, fibrous webs consisting as to 100 percent glass fibers have the great disadvantage that their folding strength, that is their tensile strength is reduced to zero after they have been folded several times.

Finally, U.S. Pat. No. 3,035,965 describes a method of making glass fibers containing fibrous webs by processing a nonfibrillating organic fiber material together with about 10 percent by weight, calculated on the organic fibers, of glass fibers by a wet process. Since the fibrous web thus produced largely consist of the organic fibers, however, these webs have the character of the organic fibers used rather than the character of glass-fiber webs.

Indeed, the glass fibers act solely as a carrier material for the binder, which is underlined by the use of highly expensive ultrafine glass fibers having a diameter of 0.2-2.5 microns to ensure a uniform distribution of the binder. Typical commercial glass fibers, however, have diameters ranging from 3 to 15 microns, mostly 7 to 12 microns.

The present invention relates to glass containing fibrous webs which do have the character of glass-fiber webs, but do not have the above-described disadvantages, especially with respect to the great loss in tensile strength after being folded several times. It has been found that such webs can be made by first preparing a homogeneous aqueous suspension of fibrous of a C-glass, preferably an E-glass, having a diameter of 4–15 microns and fibers of a material selected from the group of polyesters, polyamides, and polyvinyl chloride, the ratio by weight between the glass fibers on the one hand and the organic fibers on the other ranging from 10:1 to 1:1, bringing said suspension on to a moving screen cloth, removing the excess water, a binder added somewhere during the process, and drying the fiber mat provided with a binder, by heating.

The addition of polyester fibers has the unexpected result that the values for the tensile strength, the elongation at break, the folding number, and the tensile strength after several times folding do not have a linear relation to the percentage composition, but deviate in favor of the mixtures. The same applies, although to a somewhat lesser extent, to the addition of polyamide and polyvinyl chloride fibers. The accompanying drawing shows, by way of example, the tensile strength and the elongation at break plotted against the glass/polyester composition, in percent by weight, of a fibrous web of 50 g./m.$^2$ and containing 25 percent polyvinyl alcohol as a binder. As can be seen the tensile strength ranges from about 15 kg./5 cm. to 28 kg./5 cm.

These favorable mechanical characteristics of the subject mixed-fiber webs render them suitable not only for reinforcing synthetic resin materials, but as a carrier material if a strong, yet flexible, rot-resistant, and dimensionally stable carrier material is required.

The glass-fiber material is preferably made from the alkali-free E-glass, although C-glass may be used. This glass may be suspended in water in the form of chopped glass yarn, glass pile fibers, or glass wool. The extent to which the glass-fiber strands or the glass wool are disintegrated can be controlled in dependence upon the contemplated use of the finished web. If it is desired to use the end product as surface webs, is desirable for the stands to be disintegrated into their monofilaments as much as possible. On the other hand, if it is desired to use the glass-fiber web for reinforcement purposes, then the glass-fiber strands should be milled to a minor extent or not at all, so that an open material is produced, which readily absorbs synthetic resin.

As stated before, the organic fibers may be selected from the group of polyvinyl chloride, polyamides and polyesters. Naturally, mixtures of these kinds of fibers may also be used. We preferably use pile fibers having a length of 5–50 mm. and a thickness of 1.5–50 denier. The cross-sectional configuration of the fibers may be round, for example, but also laminar or triangular. Other cross-sectional configurations are also suitable, and the fibers may be both hollow and solid.

The weight ratio between the glass fibers and the organic fibers ranges from 10:1 and 1:1, preferably from 7:1 to 3:1. The glass fibers and the organic fibers may be dispersed in water together by means of suitable milling equipment; alternatively the glass fibers and the organic fibers may be separately suspended in water, whereafter the two suspensions are combined.

In selecting the organic fibers, the contemplated use of the ready web is of prime importance. For a dimensionally stable end product polyester fibers are preferred, but for the purpose of reinforcing polyvinyl chloride it is recommendable to use polyvinyl chloride fibers, by virtue of which better adherence is achieved and the stretch characteristics become virtually equal, thereby reducing the risk of delamination to a minimum.

For the binder a great variety of known per se materials may be used, for example, urea-formaldehyde, melamine-formaldehyde and phenol resins, polyesters, epoxy resins, polyvinyl acetate, polyvinyl alcohol, polyvinyl chloride, polyacrylates, polyurethanes, starch and cellulose derivatives; and various copolymers. If the web is intended for reinforcing a fusible material, such as bitumen it is recommendable to use a binder having a higher tensile strength, a lower elongation and a higher melting point than has the fusible material. One contemplated use of such a combination is as roof-covering material. On the other hand, if the glass-fiber web is intended for reinforcing a thermosetting material, then it is recommendable to select a binder which is soluble in the nonset thermosetting material. As a matter of fact, after the setting, the thermosetting material acts as a binder. For fibrous webs intended for incorporation in a polyester composition, we preferably use a styrene-soluble binder.

The proportion of the binder is preferably 5–50 percent by weight, calculated on the total weight of the web.

The binder can be applied to the fibers by spraying, sprinkling, and/or impregnating the fibers with binder. Preferably, the binder is added to the aqueous fiber suspension, and a web is formed from this composition on the moving screen cloth. In that case, the binder must be used in such a form that during the removal of the water it remains on the copper cloth and in the fibermat being formed; preferably in the form of fibers, water-dispersible granules, or a latex precipitate or coacervate.

The subject wet-process made, mixed-fiber webs can be made in any desired thickness. Mostly, however, the weight will range from 10 to 500 g./m.², preferably from 30 to 60 g./m.². This means that given a square meter of web product the weight will be between 10 and 500 grams, preferably from 30 to 60 grams. The web thickness will vary with the indicated weights. These webs have excellent strength characteristics as compared with fiber webs produced by the dry process. This is due to the extremely uniform structure of the web. It is thus possible to make fiber webs having a tensile strength in the transverse direction and in the longitudinal direction of 25 kg./5 cm. These values are twice those of conventional webs.

The invention is illustrated in and by the following examples.

EXAMPLE I

In a mill having a capacity of 2 liters and a speed of 2,800 r.p.m. 20 g. glass-fiber strands produced from an E-glass, and having a length of 10 mm. and a thickness of 12 microns, were disposed in water for 20 minutes. This fiber suspension was then diluted with water until the dry content was 0.1/0.7 g. of a powdery ureaformaldehyde precondensate, insoluble in cold water, were added and uniformly distributed in the fiber mass by stirring. Five hundred cubic centimeters of the suspension thus obtained was formed into a web on a web-forming device, the web was couched and transferred to a drying plate having a temperature of 150° C. During the heating the binder is dissolved in the water that is still present, moves to the points where the fibers are in contact with each other, and causes the fibers to adhere together upon further drying. Finally the product was heated at 160° C. for 2 further minutes to fully condense the ureaformaldehyde resin.

This whole treatment was repeated, employing 15 g. glass-fiber strands and 5 g. polyamide (poly-ε-caprolactam) pile fibers having a length of 15 mm. and a thickness of 20 denier.

The properties of the two fiber webs are shown in the following table.

TABLE I

| | fiber composition | | |
|---|---|---|---|
| | 100% A-glass commercial product | 100% E-glass | 75% E-glass 25% polyamide |
| basic weight g./m.² — | 55 | 51 | 52 |
| tensile strength kg./5 cm. | 15 | 24 | 23 |
| elongation at break in % | 2 | 2 | 3 |
| folding number x) | 0 | 5 | 50 |
| tensile strength after 25 times folding in — kg./5 cm. xx | 0 | 0 | 14 | x) Folding number according to Köhler-Molin at a load of 800 g./1.5 cm.
xx) Determination of tensile strength according to Brecht-Wesp under a load of 6 KG.

EXAMPLE II

Example (Terlenka) having was repeated, employing instead of ureaformaldehyde precondensate the same quantity of polyvinyl alcohol, and instead of the poly-ε-caprolactam fibers the same quantity of polyethylene glycol-terephthalate fibers (Terlenka) having a length of 6 mm. and a thickness of 1.5 denier.

The properties are shown in the following table.

TABLE II

| | fiber composition | | |
|---|---|---|---|
| | 100% A-glass | 100% E-glass | 75% E-glass 25% polyester |
| basic weight g./m.² | 55 | 51 | 52 |
| tensile strength kg./5 cm. | 15 | 28 | 27 |
| elongation at break in % | 2 | 2.5 | 3.5 |
| folding number x) | 0 | 10 | 3000 |
| tensile strength after 25 times folding in kg./5 cm. | 0 | 0 | 16.5 | x) Folding number according to Köhler-Molin at a load of 400 g./1.5 cm.

We claim:

1. A method of making a glass-fiber web having low weight per square meter and a high folding strength, which comprises preparing a homogeneous suspension consisting essentially of fibers of a glass having a melting point of above about 900° C., a low alkali content and a diameter of 3–15 microns as the only inorganic fibers, fibers of a material selected from the group consisting of the polyesters, polyamides and polyvinyl chloride, and from about 5–50 percent by weight of a binder in water, the weight ratio between the glass fibers on the one hand and the organic fibers on the other ranging from 10:1 to 1:1; bringing said suspension onto a moving screen cloth; removing the excess of water; and drying the fiber mat provided with said binder by heating.

2. A method according to claim 1, wherein the weight of ratio of the glass fibers to organic fibers is 7:1 to 3:1.

3. A method according to claim 1, wherein the glass fibers are made of an alkali-free glass.

4. A method according to claim 1, wherein the organic fibers are polyester pile fibers having a length of 1–30 mm. and a thickness of 1.5–50 denier.

5. A method according to claim 1, wherein there is thus produced a fiber web has a weight of 10–500 g./m.².

6. A method according to claim 5, wherein the thus-produced web has a weight of 30–60 g./m.².

7. The method of claim 1 wherein the glass fiber has a diameter of from 7 to 12 microns.

8. A glass-fiber web consisting essentially of a homogeneous mixture of glass fibers having a melting point of about about 900° C., a low alkali content, and a diameter of from 3 to 15 microns as the only inorganic fibers; organic fibers of a material selected from the group consisting of polyesters, polyamides, and polyvinylchloride; and a binder; the weight ratio between the glass fibers and organic fibers being from 10:1 to 1:1; and the binder being present at from about 5 to 50 percent by weight; said web having a weight of about 10–500 g./m.² and a tensile strength of about 15 kg./5 cm. to 28 kg./5 cm.

9. The glass-fiber web of claim 8 wherein said web has a weight of about 30–60 g./m.².

10. The glass-fiber web of claim 8 wherein the glass fibers have a melting point of about 1,200° C., are alkali free, and have a diameter of from 7 to 12 microns.

* * * * *